United States Patent
Fagerburg et al.

(10) Patent No.: US 7,359,949 B2
(45) Date of Patent: Apr. 15, 2008

(54) REMOTELY CONTROLLING A UNIX-BASED SYSTEM

(75) Inventors: Eric D. Fagerburg, Orem, UT (US); Charles M. Morgan, Springville, UT (US)

(73) Assignee: Intel Corporation, Santa Clara, CA (US)

( * ) Notice: Subject to any disclaimer, the term of this patent is extended or adjusted under 35 U.S.C. 154(b) by 1508 days.

(21) Appl. No.: 09/752,100

(22) Filed: Dec. 28, 2000

(65) Prior Publication Data

US 2002/0087650 A1    Jul. 4, 2002

(51) Int. Cl.
*G06F 15/16* (2006.01)

(52) U.S. Cl. ............. 709/208; 709/208; 709/209; 709/223; 709/225; 715/778

(58) Field of Classification Search .......... 709/200, 709/203, 208, 209, 219, 223, 224, 227, 247, 709/250, 229, 225; 379/265.06; 715/764, 715/762, 778

See application file for complete search history.

(56) References Cited

U.S. PATENT DOCUMENTS

| | | | | |
|---|---|---|---|---|
| 5,241,625 A | * | 8/1993 | Epard et al. | 345/502 |
| 5,564,002 A | * | 10/1996 | Brown | 715/778 |
| 5,577,254 A | * | 11/1996 | Gilbert | 707/104.1 |
| 5,805,163 A | * | 9/1998 | Bagnas | 715/768 |
| 5,949,412 A | * | 9/1999 | Huntsman | 345/740 |
| 6,138,150 A | * | 10/2000 | Nichols et al. | 709/219 |
| 6,141,022 A | * | 10/2000 | Anfossi et al. | 345/545 |
| 6,198,479 B1 | * | 3/2001 | Humpleman et al. | 709/201 |
| 6,438,619 B1 | * | 8/2002 | Coman | 709/203 |
| 6,448,958 B1 | * | 9/2002 | Muta | 345/169 |
| 6,505,238 B1 | * | 1/2003 | Tran | 709/208 |
| 6,505,245 B1 | * | 1/2003 | North et al. | 709/208 |
| 6,594,686 B1 | * | 7/2003 | Edwards et al. | 709/203 |
| 6,650,747 B1 | * | 11/2003 | Bala et al. | 379/265.06 |
| 6,680,730 B1 | * | 1/2004 | Shields et al. | 709/203 |
| 6,701,380 B2 | * | 3/2004 | Schneider et al. | 709/250 |
| 6,710,790 B1 | * | 3/2004 | Fagioli | 715/778 |
| 6,754,710 B1 | * | 6/2004 | McAlear | 709/227 |
| 6,895,588 B1 | * | 5/2005 | Ruberg | 709/223 |
| 7,100,069 B1 | * | 8/2006 | Hickman et al. | 709/208 |

OTHER PUBLICATIONS http://www.officesoft.com/utilities/doublevision.html, 1999.*
http://www.p21.com/partners/pdf/doublevison.pdf, 1999.*
Business Wire, Tridia Releases Linux Version of its Remote Control Software, Nov. 10, 1999.*
Richardson et al., Virtual Network Computing, IEEE Internet Computing vol. 2 #1, Jan./Feb. 1998.*

(Continued)

*Primary Examiner*—Ario Etienne
*Assistant Examiner*—Ramy M Osman
(74) *Attorney, Agent, or Firm*—Fish & Richardson P.C.

(57) ABSTRACT

Remotely controlling a UNIX-based system includes prompting a first user at a UNIX-based machine for permission for a second user at a machine remotely-located from the UNIX-based machine to control the UNIX-based machine and if the first user grants permission, enabling the second user to use the UNIX-based machine through the machine remotely-located from the UNIX-based machine.

28 Claims, 5 Drawing Sheets

OTHER PUBLICATIONS

McLaughlin, J. "New Product Briefs—Jul. 1995", FlashBack 1356, Aug. 1995 [retrieved Mar. 31, 2005] Retrieved from Google cache [online]: http://www.google.com/search?q=cache:6i30yaXp58MJ:ftp.fh-wolfenbuettel.de/links/sunflash/1995/1300-1339/1356.prods.txt.*

Tridia's DoubleVision, First Look, Sep. 1998 [retrieved Apr. 1, 2005], Retrieved from http://www.tpci.com/tridia_sep_98.htm.*

DoubleVision for UNIX Systems Product Guide, Table of Contents, copyright 1996 [retrieved Apr. 1, 2005], Retrieved from http://triweb.tridia.com/documentation/dvu_tblcnts.html.*

DoubleVision Pro User Guide, Chapter 6, copyright 2003, [retieved Apr. 1, 2005] Retrieved from http://www.tridia.com/dvpro40UserGuide/ch6unixlinux.htm.*

Hines, Jason., ttysnoop 0.12d, Console/Monitoring Dec. 14, 1999, [retrieved Apr. 1, 2005] Retrieved from http://www.an-netz.de/html-news/freshmeat/archiv/1999-Dec-14/54.html.*

DoubleVision 3.0 by Tridia, copyright 1999, http://www.officesoft.com/utilities/doublevision.html.*

Rizzo, John, "Virtualization, Emulation, and Remote Control Solutions: Running Windows by Remote Control", 2007, http://www.macwindows.com/emulator.html [acessed Jul. 17, 2007].*

* cited by examiner

REMOTELY CONTROLLING A UNIX-BASED SYSTEM

BACKGROUND

This invention relates to remotely controlling a UNIX-based system.

UNIX is a multi-user, multitasked operating system typically written in the C programming language. Any machine capable of running (compiling) programs written in C (or whatever programming language is used) can install and run UNIX. Users can enter UNIX commands on such a machine for execution.

DESCRIPTION

Figure 1:
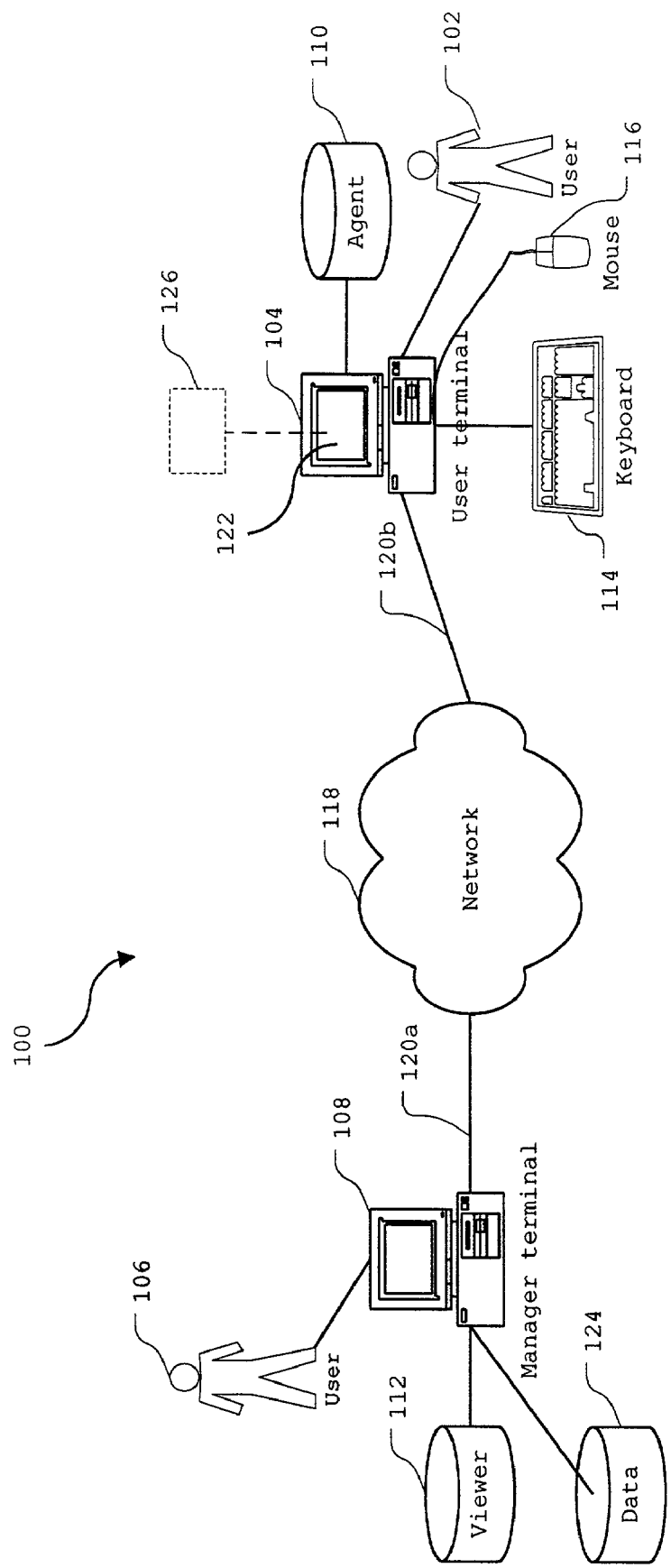
FIG. 1 is a diagram of a network configuration.

Referring to FIG. 1, a simplified network configuration 100 includes a user 102 at a user terminal 104 running a UNIX-based system. The user 102 has the ability to grant or deny permission to a remote user 106 at a remote terminal 108 to remotely control the user terminal 104 from the remote terminal 108.

When the remote user 106 wants to remotely control the user terminal 104, a remote viewer agent 112 at the remote terminal 108 notifies a remote control agent 110 at the user terminal 104. The remote control agent 110 runs as a UNIX-based daemon running in the background of any programs or applications currently running on the user terminal 104. The remote control agent 110 can be included as part of the user terminal 104, e.g., as a stored program, or be otherwise accessible to the user terminal 104, e.g., across the network 118.

Similarly, the remote viewer agent 112 can be included as part of the remote terminal 108 or be otherwise accessible to the remote terminal 108. The remote viewer agent 112 can be used to control any number of user terminals across any network, not just the shown network 118. For example, the remote terminal 108 may include or have access to a collection of data 124 including a list of user terminals connected to a network. The remote user 106 can choose to remotely control any of those user terminals over the network.

The remote viewer agent 112 sends notification to the remote control agent 110 over a network 118 and communication links 120a and 120b. The communication links 120a and 120b between the user terminal 104 and the remote terminal 108 can be any kind and any combination of communication links such as modem links, cables, point-to-point links, infrared connections, fiber optic links, cellular links, Bluetooth, satellite links, or other similar types of links. Furthermore, the network 118 can include any kind and any combination of local networks, private networks, public networks, or other similar types of networks.

The remote agent 110 creates a new session at the user terminal 104 and allocates a new virtual terminal 126 in the background of the user terminal 104. The remote agent 110 duplicates the current contents displayed on a display screen 122 of the user terminal 104 into the new virtual terminal 126, inserts a prompt on the new virtual terminal 126, and switches the display on the display screen 122 to the new virtual terminal display 126 (the current contents plus the prompt).

When a machine is running in text mode, a daemon typically does not interact with the machine's console (display terminal or screen), i.e., the daemon typically closes stdin, stdout, and stderr. No messages are shown on the console indicating when or if the daemon has taken any action. Instead, the daemon's actions are recorded in a collection of data for the machine, such as a log file, that can be checked after-the-fact to determine the daemon's activities (if any). By displaying the text prompt to the user 102, the remote control agent 110 lets the user 102 know in real time when the remote user 108 wants to take remote control of the user terminal 104. Furthermore, the user 102 has the ability to allow or prevent the remote control of the user terminal 104 by the remote user 106.

Generally, the prompt asks the user if a remote user should be allowed to control the user terminal 104. The user 102 can enter a response to the prompt using, for example, a keyboard 114 or a mouse 116. If the user 102 grants permission, then the remote user 106 can control the user terminal 104 as if the remote user 106 was directly using the user terminal 104. For example, the remote user 106 can issue text commands to the user terminal 104 via the network 118 and the communication links 120a and 120b. Actions that the remote user 106 may issue to the user terminal 104 include transferring files, deleting files, adding files, rebooting the user terminal 104, and other similar actions allowable in the UNIX-based system.

The user terminal 104 can be any machine capable of running (compiling) programs written in the same programming language (e.g., C, machine language, etc.) as the UNIX-based system and that can install and run the UNIX-based system, such as portable and stationary computers, personal digital assistants, network servers, and other similar devices. Similarly, the user terminal 104 can use any hardware platform, such as disk operating system (DOS), a Microsoft Windows-based system, a Macintosh-based system, a Linux-based system, or other similar platform.

The user terminal 104 can use any version of UNIX, such as Linux, System III (UNIX by AT&T, American Telephone & Telegraph Company), System V (UNIX by AT&T), Solaris (UNIX by Sun Microsystems, Inc.), HP-UX (UNIX by Hewlett-Packard Company), Advanced Interactive Executive (AIX, UNIX by IBM, International Business Machines, Inc.), UnixWare (UNIX by SCO, the Santa Cruz Operation, Inc.), Berkeley UNIX versions, and other similar UNIX versions.

Figure 2:
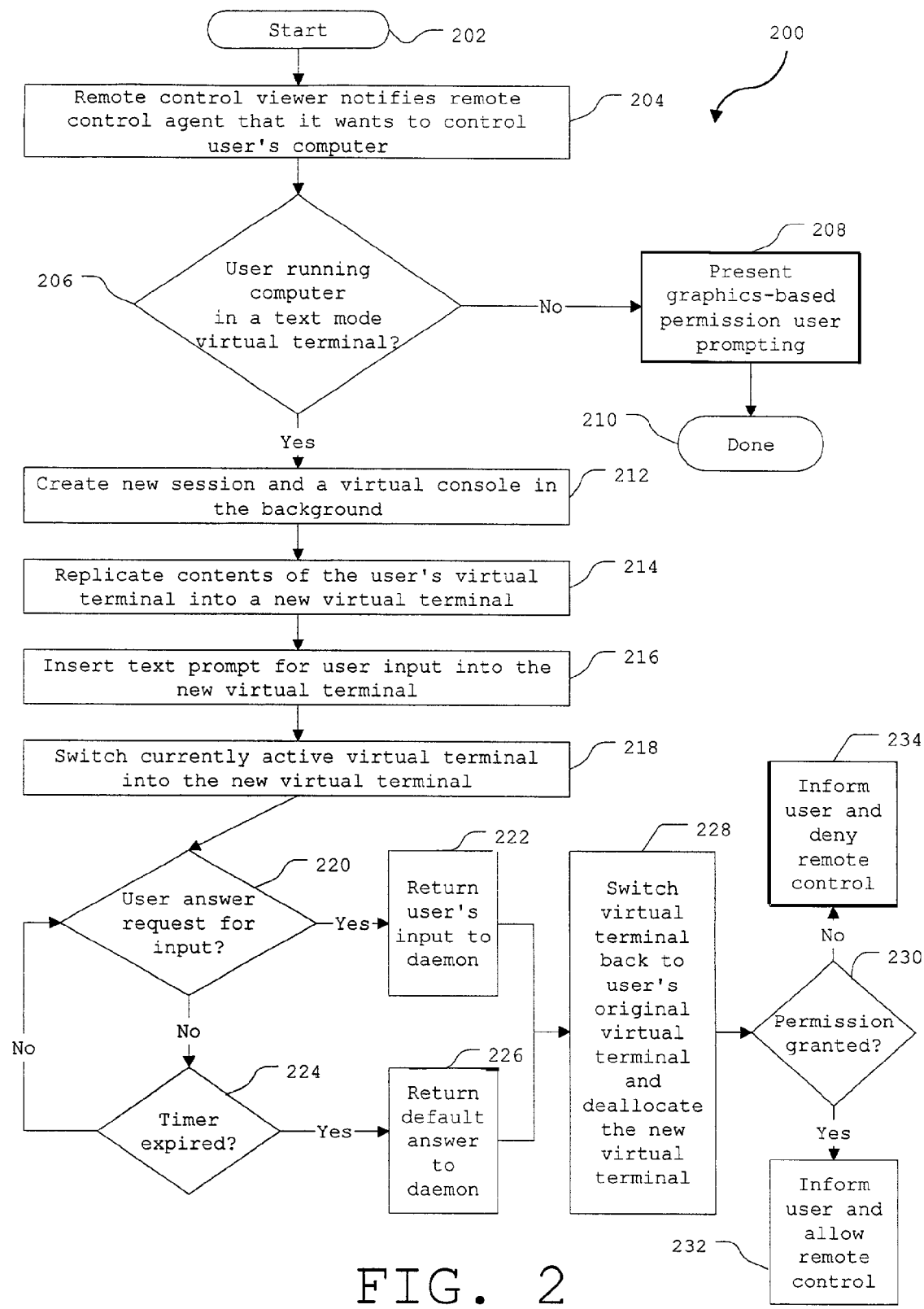
FIG. 2 is a flowchart showing a process of remotely controlling a UNIX-based system.

Referring to FIG. 2, the remote user 106 can attempt to remotely control the user terminal 104 using, for example, a remote control process 200. The remote control process 200 starts 202 when the remote viewer agent 112 notifies 204 the remote control agent 110 that the remote terminal 108 wants to remotely control the user terminal 104. The remote viewer agent 112 sends this notification when the remote user 106 enters a request at the remote terminal 108 to remotely control the user terminal 104 or otherwise engages the remote viewer agent 112.

The remote control agent 110 determines 206 if the user terminal 104 is running in text mode. Text mode is a screen display mode that only displays text; it does not display graphics. In other words, if a machine is operating in text mode, it only displays characters, not pictures or graphics images.

If the user terminal 104 is not running in text mode, then the remote control agent 110 presumes that the user terminal 104 can display graphics and presents 208 a graphics-based permission prompt on the user terminal 104 to the user 102. For example, the prompt may be a dialog box with a "give permission" button and a "refuse permission" button that the user 102 can click on and select with the mouse 116. Based on the user's response to the prompt, the remote user 106 may be able to remotely control the user terminal 104.

If the user terminal 104 is running in text mode, then the remote control agent 110 creates 212 a new session and the virtual console 126 in the background of the user terminal's currently active console. In other words, the remote control agent 110 creates or compiles the instructions necessary to create a new screen for display on the user terminal 104 on the display screen 122. This new screen is created or compiled transparently to the user 102, i.e., without the user's knowledge. For example, the remote control agent 110 may open a new tty (here, a new, "virtual" terminal) in non-blocking mode and create a new stdin (a file pointer that provides access to the keyboard 114) and a new stdout and a new stderr (file pointers that write data to the display screen 122) for the new tty.

The remote control agent 110 replicates 214 the contents of the user terminal's currently active display screen 122 into the virtual console 126. To replicate the current contents of the user terminal's display screen 122, the remote control agent 110 gathers data about the display screen 122 such as the size of the display screen 122 and the cursor's position on the display screen 122. The remote control agent 110 also determines and reserves the amount of memory necessary to store the current contents of the display screen 122 to use in the replication.

The remote control agent 110 also inserts 216 a text prompt into the virtual console 126. The text prompt appears as the last text line on the virtual console 126 (although it could be anywhere) and informs the user 102 that a remote user would like to remotely control the user terminal 104. For example, the text prompt could be "Will you allow <remote user> to remote control your machine? Y/N," "Will you allow <remote user> to transfer files? Y/N," "May another user remote control your machine?," or other similar message.

One or more text prompts may be available for display by the remote control agent 110. If two or more text prompts are available, the remote control agent 110 may choose which text prompt to display to the user 102 based on information sent in the notification from the remote terminal 108. For example, the notification could indicate that the remote user 108 desires to transfer files from the user terminal 104, in which case the remote control agent 110 would choose a text prompt such as "May <remote user> transfer files? Y/N."

Figure 3:
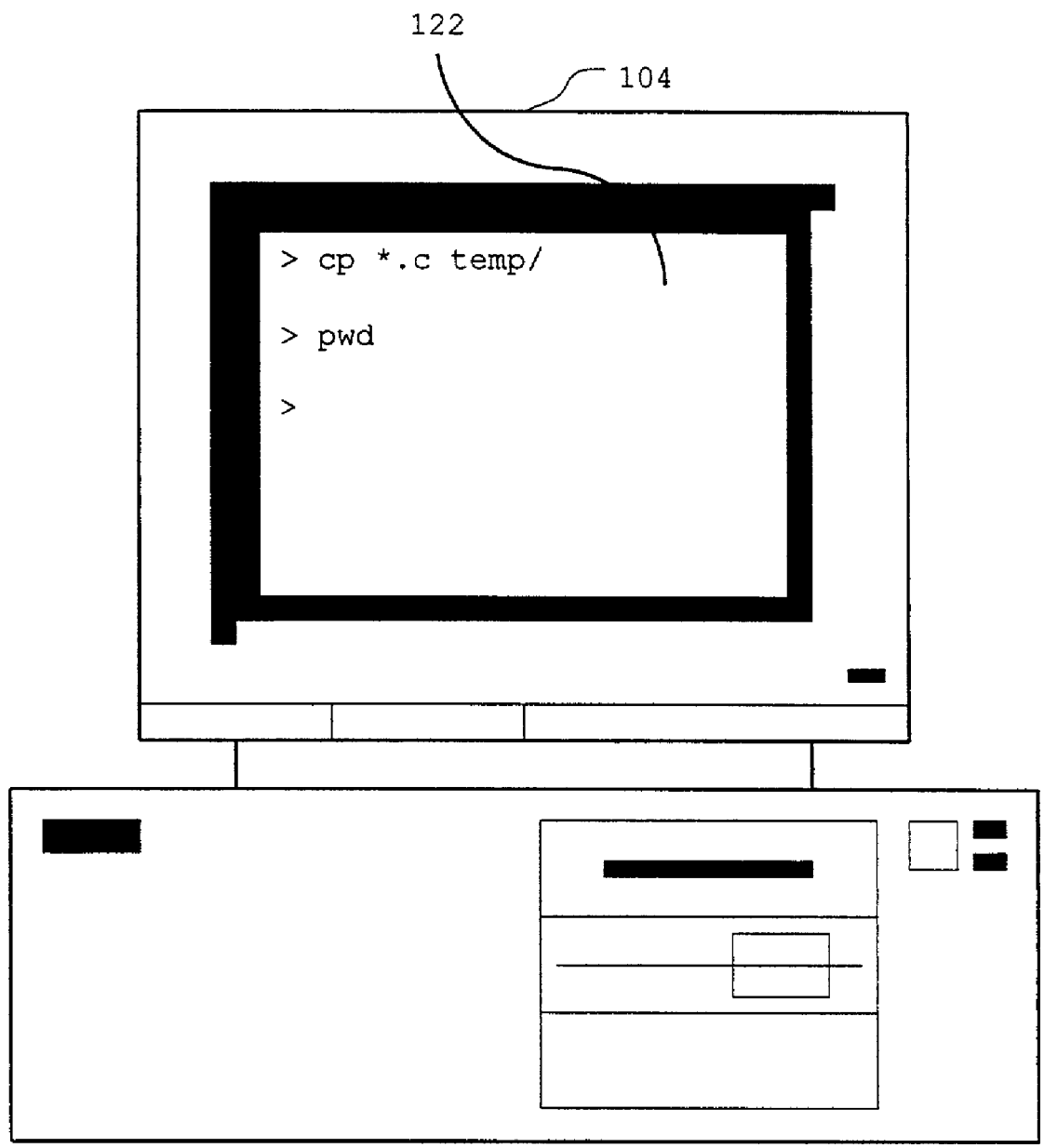
FIG. 3 shows a terminal displaying a current screen.
Figure 4:
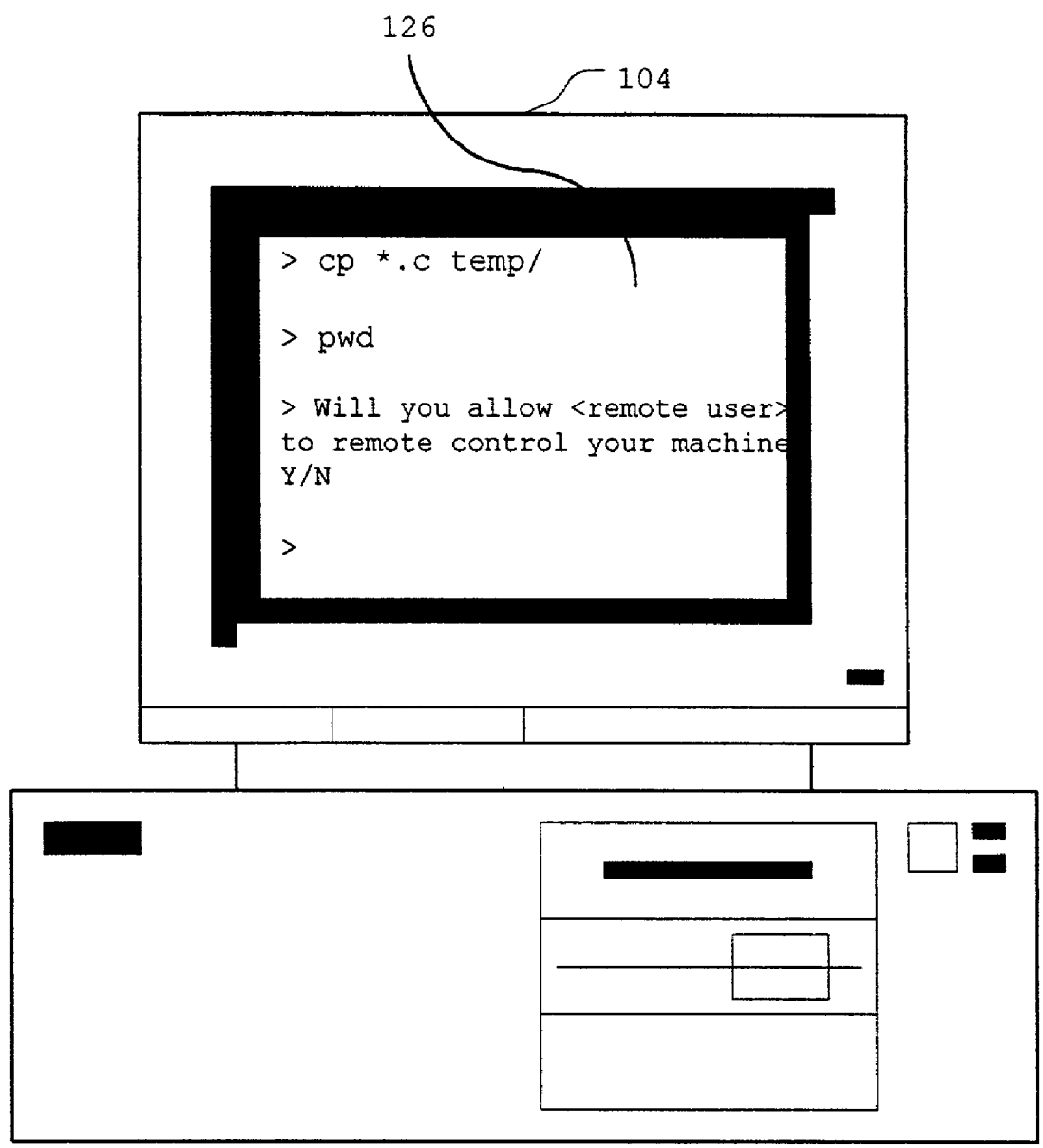
FIG. 4 shows the terminal displaying the current screen of FIG. 3 plus a prompt.

After creating the virtual console 126 and inserting the text prompt, the remote control agent 110 switches 218 from the currently active display screen 122 (shown for example in FIG. 3) to the virtual console 126 (shown for example in FIG. 4). In this way, the user 102 sees on the display screen 122 what he or she was seeing before the switch to the virtual console 126 (except for the addition of the text prompt). The user 102 experiences minimal visual disruption during the switching, likely not being able to detect that any virtual terminal switching was done (except for the addition of the prompt).

Figure 5:
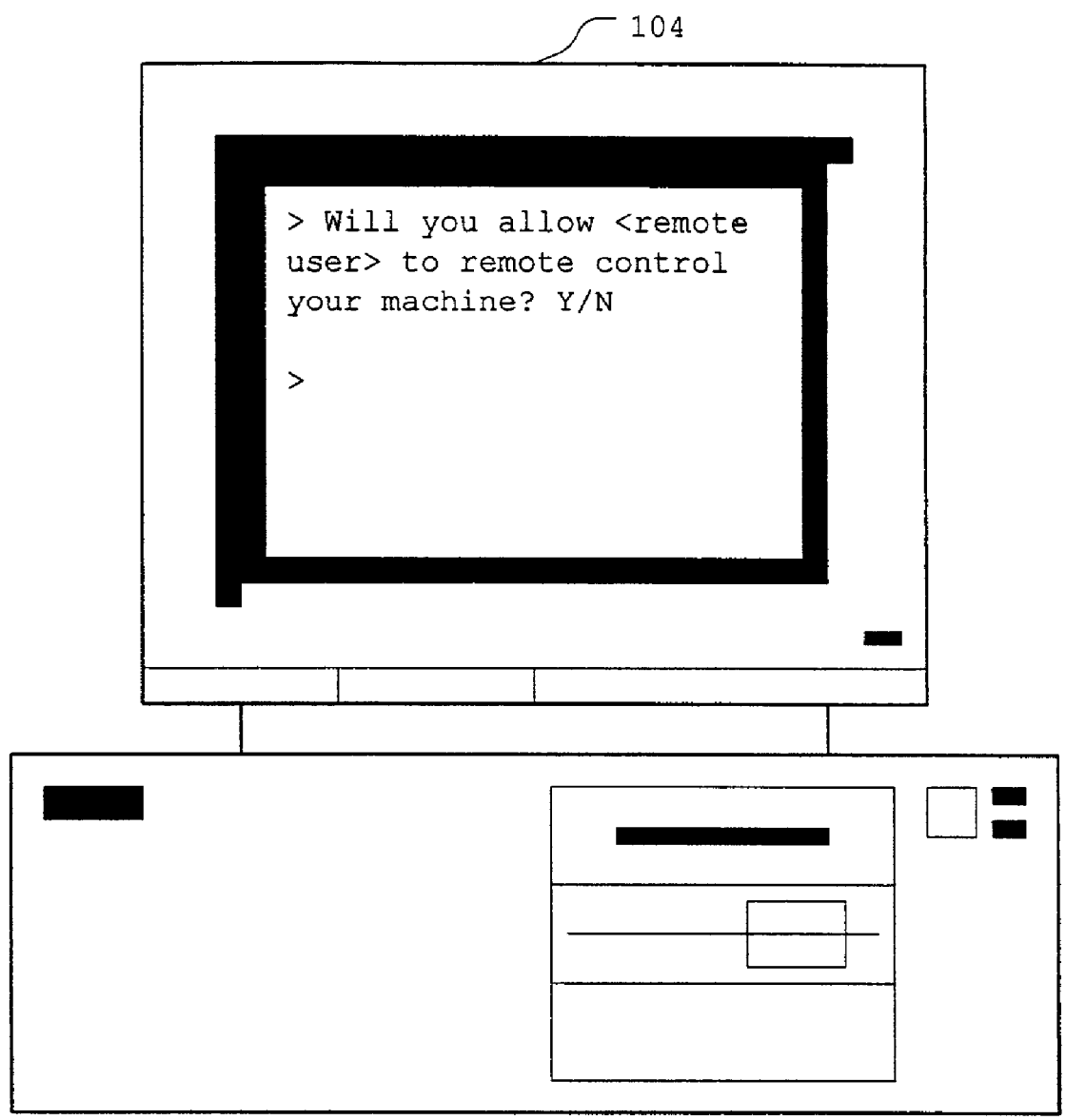
FIG. 5 shows a terminal displaying a prompt.

Instead of inserting the text prompt into the virtual console 126, the remote control agent 110 may copy and store the current contents of the display screen 122 but display a screen with only the text prompt as shown for example in FIG. 5.

The remote control agent 110 may also switch the user terminal 104 into raw mode so the remote control agent 110 can more quickly receive user input. In raw mode, data input to the user terminal 104, e.g., a response to the prompt, is passed to the appropriate device or mechanism, e.g., the remote control agent 110, before being otherwise processed or interpreted.

The remote control agent 110 determines 220 if the user 102 responded to the text prompt. If the user 102 responded, then the user's response is returned 222 to the remote control agent 110. If the user 102 has not responded, e.g., entered nothing or entered data not in a form recognizable by the remote control agent 110 such as the recognizable "Y" or "N", "y" or "n", "1" or "2", "yes" or "no", etc., then the remote control agent 110 determines 224 if a threshold amount of time has passed since the text prompt was displayed to the user 102. The threshold amount of time is a predetermined time interval in which the user must respond to the text prompt before a default response is returned to the remote control agent 110. If the threshold amount of time has not expired, then the user 102 is given another text prompt requesting input, either giving the same text prompt again or asking in a different text prompt format for another response because the previous response was in an unknown format. If the threshold amount of time has not expired, then a default response is returned 226 to the remote control agent 110. The default response can be either to allow or to disallow remote control of the user terminal 104.

Once the remote control agent 110 receives a response to the text prompt, the remote control agent 110 switches 228 the virtual console 126 back to the user's original display screen 122 (the currently active display screen 122 that the user 102 saw before the user terminal 104 was switched to the virtual console 126) and deallocates the virtual console 126. The deallocation can also include deallocating any memory reserved to store the contents of the currently active console.

The remote control agent 110 also determines 230 if the response to the text prompt allows the remote user 106 to remotely control the user terminal 104. If permission was granted by the user 102 (or through the default response), then the remote control agent 110 informs 232 the remote user 106, who can then remotely control the user terminal 104. If permission was not granted, then the remote control agent 110 informs 234 the remote user 106, who may not now remotely control the user terminal 104 but may later request to remotely control the user terminal 104.

The techniques described here are not limited to any particular hardware or software configuration; they may find applicability in any computing or processing environment. The techniques may be implemented in hardware, software, or a combination of the two. Preferably, the techniques are implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a machine system. However, the programs can be implemented in assembly or machine language, if desired. In any case, the language may be a compiled or interpreted language.

Each such program is preferable stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
   replicating current contents of a screen on a UNIX-based machine onto a new screen running in a background of the UNIX-based machine;
   prompting a first user at the UNIX-based machine for permission for a second user at a machine remotely-located from the UNIX-based machine to control the UNIX-based machine; and
   if the first user grants permission, enabling the second user to use the UNIX-based machine through the machine remotely-located from the UNIX-based machine.

2. The method of claim 1 in which the prompting comprises making the prompt known to the first user by displaying information on a display of the UNIX-based machine.

3. The method of claim 1 in which the second user uses the UNIX-based machine through the machine remotely-located from the UNIX-based machine as if the second user was directly using the UNIX-based machine.

4. The method of claim 1 further comprising adding to the new screen a prompt that asks the first user for the permission.

5. The method of claim 1 further comprising replacing the current contents of the screen on the UNIX-based machine with the new screen.

6. The method of claim 1 in which the using of the UNIX-based machine includes issuing text commands to the UNIX-based machine from the machine remotely-located from the UNIX-based machine.

7. The method of claim 1 further comprising, if the first user does not grant permission, preventing the second user from using the UNIX-based machine through the machine remotely-located from the UNIX-based machine.

8. The method of claim 1 further comprising, if the first user at the UNIX-based machine does not respond to the prompting within a certain threshold time, enabling by default the second user to use the UNIX-based machine.

9. The method of claim 1 in which the prompting is text-based.

10. An article comprising:
    a machine-readable medium which stores machine-executable instructions, the instructions causing a machine to;
    replicate current contents of a screen on a UNIX-based machine onto a new screen running in a background of the UNIX-based machine;
    prompt a first user at the UNIX-based machine for permission for a second user at a machine remotely-located from the UNIX-based machine to control the UNIX-based machine; and
    if the first user grants permission, enable the second user to use the UNIX-based machine through the machine remotely-located from the UNIX-based machine.

11. The article of claim 10 in which the prompting includes making the prompt known to the first user by displaying information on a display of the UNIX-based machine.

12. The article of claim 10 in which the second user uses the UNIX-based machine through the machine remotely-located from the UNIX-based machine as if the second user was directly using the UNIX-based machine.

13. The article of claim 10 further causing a machine to add to the new screen a prompt that asks the first user for the permission.

14. The article of claim 10 further causing a machine to replace the current contents of the screen on the UNIX-based machine with the new screen.

15. The article of claim 10 in which the using of the UNIX-based machine includes issuing text commands to the UNIX-based machine from the machine remotely-located from the UNIX-based machine.

16. The article of claim 10 further causing a machine to, if the first user does not grant permission, prevent the second user from using the UNIX-based machine through the machine remotely-located from the UNIX-based machine.

17. The article of claim 10 further causing a machine to, if the first user at the UNIX-based machine does not respond to the prompting within a certain threshold time, enable by default the second user to use the UNIX-based machine.

18. The article of claim 10 in which the prompting is text-based.

19. A system comprising:
    a first device configured to run UNIX; and
    a mechanism accessible by the first device and configured to run a process on the first device transparently to a user of the first device, the process configured to replicate current contents of a screen on the first device onto a new screen running in a background of the first device and prompt the user of the first device for permission for a remote user at a second device at a location remote from the first device to input instructions to the first device from the second device.

20. The system of claim 19 in which the process is also configured to, it the user of the first device grants permission, enable the remote user to use the first device through the second device as if the remote user was directly using the first device.

21. The system of claim 19 further comprising a second mechanism accessible by the second device and configured to notify the first device when the remote user desires to input instructions to the first device from the second device.

22. The system of claim 19 in which the process is also configured to continuously run on the first device.

23. A method comprising:
    replicating current contents of a display screen visible to a user on a UNIX-based device onto a new screen not visible on the display screen to the user;
    inserting a prompt on the new screen to a user of the UNIX-based device to grant permission for a remote device at a location remote from the UNIX-based device to control the UNIX-based device; and replacing the current contents of the display screen with the new screen, the new screen visible to the user on the UNIX-based device.

24. The method of claim 23 further comprising, after the user responds to the prompt, returning the& UNIX-based device back to the current contents of the display screen.

25. A method comprising:
   replicating current contents of a screen on a UNIX-based machine onto a new screen running in a background of the UNIX-based machine;
   adding to the new screen a text prompt prompting a first user at the UNIX-based machine for permission for a second user at a machine remotely-located from the UNIX-based machine to control the UNIX-based machine; and
   replacing the current contents of the screen with the new screen.

26. The method of claim 25 further comprising determining if the second user may control the UNIX-based machine based on a response to the text prompt by the first user.

27. A machine-amplemented method comprising:
   receiving a request at a first programmable data processing machine for provision of remote operational control of the first machine to a second data processing machine, the first machine being a UNIX-based machine;
   determining whether a user interface of the first machine is operating in a text mode; and
   if the first machine user interface is operating in the text mode, allocating a virtual console running in a background of the first machine, adding a prompt to the virtual console asking for authorization of the request, and switching the virtual console to be a currently active console in the first machine.

28. The method of claim 27, further comprising:
   if the first machine user interface is operating in the text mode, replicating contents of an originally active console to the virtual console before adding the prompt and switching the virtual console to be the currently active console; and
   after receiving an input or a time out, switching the originally active console to then be the currently active console, and deallocating the virtual console.

\* \* \* \* \*